Figure 1:
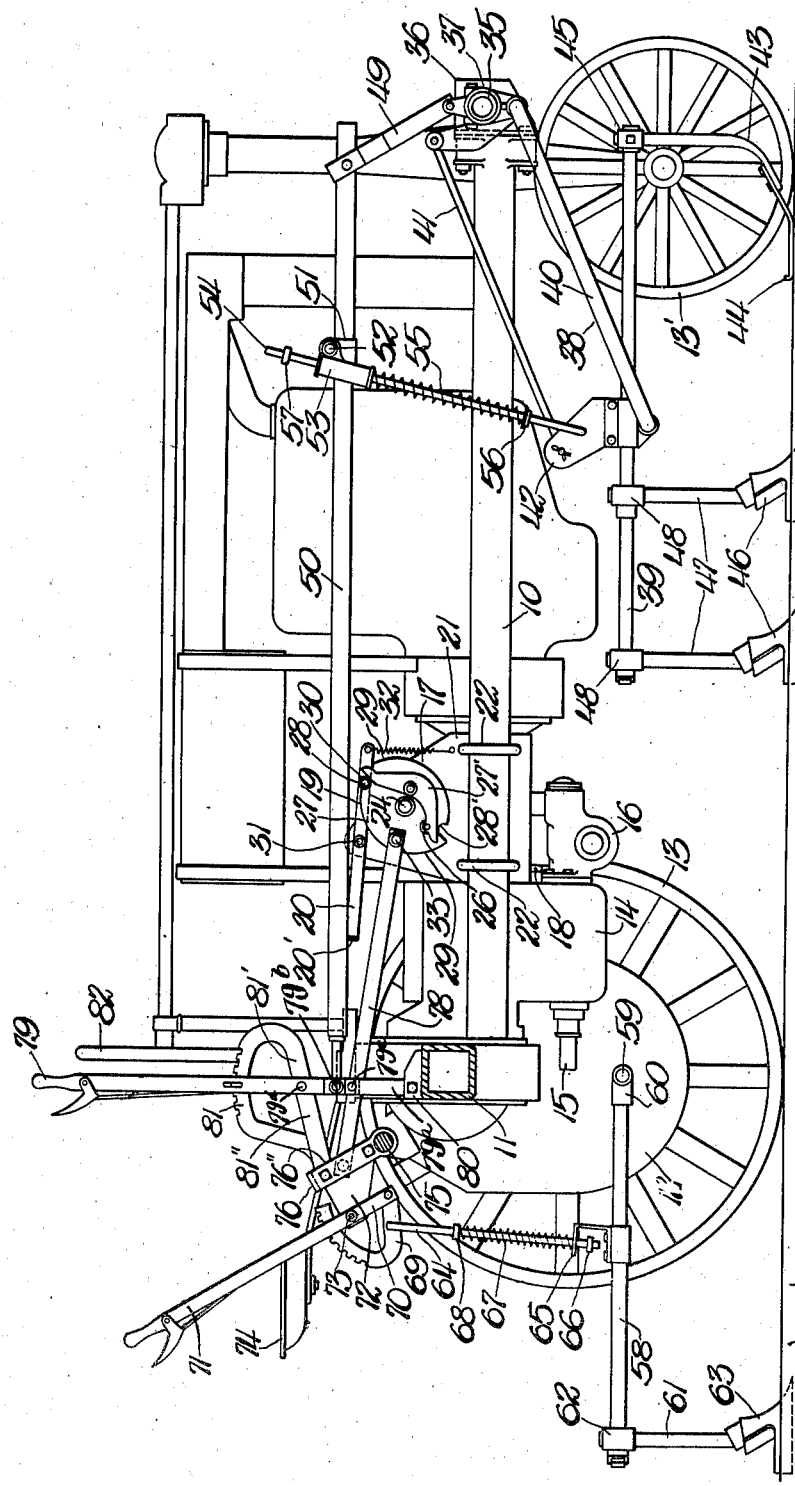

Nov. 15, 1938.                H. P. SMITH                2,136,640
              ADJUSTING MECHANISM FOR TRACTOR IMPLEMENTS
                       Filed April 3, 1936        2 Sheets-Sheet 1

Inventor
H. P. Smith
By
[signature]
Atty.

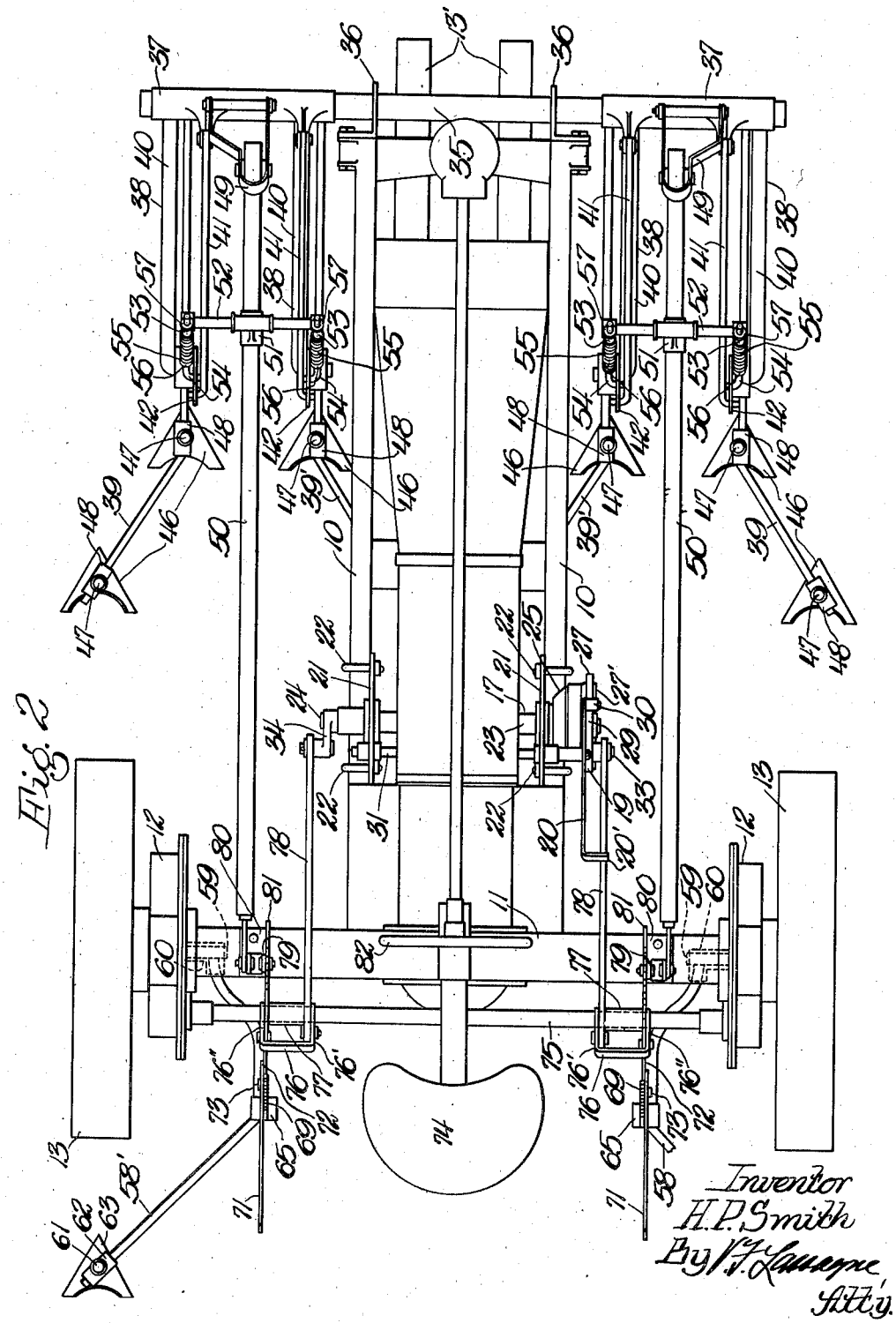

Patented Nov. 15, 1938

2,136,640

UNITED STATES PATENT OFFICE 2,136,640

ADJUSTING MECHANISM FOR TRACTOR IMPLEMENTS

Hiram P. Smith, Canton, Ill., assignor to International Harvester Company, a corporation of New Jersey Application April 3, 1936, Serial No. 72,624

6 Claims. (Cl. 97—50)

This invention relates to a power lift attachment for tractors carrying implements mounted thereon.

The main object of the invention is to provide a tractor of the general purpose type with a special implement raising and lowering mechanism whereby forwardly and rearwardly mounted cultivator attachments may be raised and lowered simultaneously, and at the same time to provide for independent adjustment of the front and rear tillage tools.

Another object of the invention is to provide a power lift mechanism to raise and lower the front and rear tillage tools simultaneously from ground engaging to transporting position.

Another object of this invention is to provide an improved arrangement for mounting two quadrant and lever means on the tractor, such that the extended actuating levers are given substantially equal and parallel movements of translation horizontally of the tractor when actuated by a power lift device on the tractor.

Another object of this invention is to provide adjusting means in which the levers for adjusting the front or the rear gangs do not rotate with respect to the tractor around a common pivot point but move longitudinally.

These and other objects which will be apparent from the detailed description to follow are accomplished by a construction, as shown in the drawings in which:

Figure 1 is a side elevation of the tractor of the general purpose type with the right rear wheel removed showing the fore and aft position of the implements with their respective adjusting mechanisms connected to the raising and lowering mechanisms; and, Figure 2 is a plan view of the tractor with the implements attached.

The tractor shown in the drawings is of a well-known construction having side frame members 10, a rear axle and differential housing 11, dependent housings 12 rigidly connected to the ends of the housings 11 and wheels 13 mounted on stub axles extending outwardly from the lower portions of the housings 12. A depending housing 14 forwardly of the rear axle housing 11 contains gearing connected to the tractor drive mechanism for operating a power take-off shaft 15 which extends centrally rearwardly from said housing under the axle housing 11 and also has a forwardly projecting spline shaft to which a gear drive and slip clutch housing member 16 is attached. A transverse power lift mechanism 17 which is driven from the gear housing 16 by a chain 18 is similar to that disclosed and claimed in assignee's copending application of A. C. Lindgren, Serial No. 35,409, filed August 9, 1935, which is now United States Patent 2,057,650, granted October 13, 1936. The power lift mechanism 17 has a one-half revolution clutch 19 which is thrown in and out of operation by a trip lever 20. The power lift mechanism 17 is supported at the mid-portion of the tractor on the side sills 10 by supporting brackets 21 which are clamped to the side members 10 by clamping bolts 22. The power lift mechanism comprises a tubular shaft 23 in which is journaled a shaft 24 and the tubular shaft 23 is constantly driven from the power take-off shaft 15 through mechanism mounted in the gear housing 16. The inner concentric shaft 24 is intermittently driven by the shaft 23 through the one-half revolution clutch mechanism 19 which will now be described. On one of the projected ends of the tubular shaft 23, in this instance at the right side of the tractor, as best shown in Figure 2, there is secured a bell shaped portion 25 of the one-half revolution clutch of the well-known pawl and ratchet type. The peripheral flange of the clutch member 25 is so formed as to be engaged by clutch rollers 26 carried on a spring pressed pawl arm 27' which is pivoted on an intermittently rotated member 27 of the clutch. The periphery of the clutch member 27 is formed with usual opposite clutch throw-out seats 28 connected by opposite tracks 29 for a clutch tripping element or roller 30. The clutch pawl 27' is controlled by the usual trip arm 20 seen in Figure 1 the ends of which are presented in the throw-out seats 28. The trip roller 30 is carried on the end of the trip arm 20. The trip arm 20 is mounted on a transverse cross shaft 31 which in turn is journaled in the support brackets 21. The trip arm is controlled by a rearwardly extending foot operated portion 20' which is normally drawn upwardly by a spring 32 which is secured at one end to the trip arm and at the other end to the supporting brackets 21 in order to retain the trip arm and roller in one of the seats 28 or in contact with the peripheral tracks 29. Upon the downward rocking movement of the rearwardly extending foot operated portion 20', the throw-out roller 30 will release the clutch and permit the clutch to engage. The roller 30 will, upon release of the trip arm 20 ride on the peripheral track 29 of the clutch member 27 until the roller 30 engages in the opposite throw-out seat 28', thus disconnecting the driven member of the clutch at the completion of its cycle of operation or one-half revolution. As the driven member 27 of the clutch is fixed to the inner shaft 24, this shaft will have corresponding movement and, therefore, eccentric crank arms 33 connected to the clutch member 27 and a crank arm 34 connected to the inner concentric shaft 24 on the left side of the tractor will in turn have the same movement, as the clutch member 27 which is in the form of intermittent motion in one direction and controlled by the operator. It is to be understood that this one-half revolution clutch mechanism may be operated when the tractor is standing still with the engine running.

Secured to the front portion of the tractor is a front transverse draft member 35 which is secured at its mid-portion by laterally spaced supporting brackets 36 to the side sills 10 of the tractor frame in the usual manner. Clamped securely to the transverse member on each side of the tractor are implement supporting draft brackets 37. Rearwardly extending from each draft bracket 37 is a plurality of implement draft beams 38. As each implement draft beam and its supporting draft bracket is the same, only one will be described and like reference characters will denote similar parts. The implement draft members are in the form of parallel links vertically spaced longitudinally of the tractor in order to give parallel movement to an implement beam 39. The implement draft beam 38 comprises a lower draft member 40 and an upper parallel link 41. The members 40 and 41 are pivotally mounted at their forward ends to the draft bracket and are pivotally connected at their rear ends to a draft plate 42. The implement beam 39 is adjustably clamped on the draft plate 42. Attached at the forward part of the implement beam 39 is a gauge shoe standard 43 to which a gauge shoe 44 is attached. The standard 43 is pivotally mounted on the implement beam by a bracket 45. The rear portion of outer beam 39 is bent outwardly and rearwardly while the rear portion of an inner beam 39' is bent rearwardly and inwardly underneath the tractor. The implement beams 39 and 39' are spaced laterally to allow the plant rows to be cultivated on each side of the rows by cultivator shovels 46 mounted on standards 47 which, in turn, are adjustably secured to the implement beams by standard brackets 48. Attached to the draft bracket 37 and pivotally mounted for oscillatory motion in a fore and aft direction is a hair-pin shaped crank arm 49. Pivotally mounted at the upper end of the arm 49 and extending rearwardly is a lifting beam 50. Connected at the forward part of the lifting beam 50 is a support bracket 51 for mounting a transversely extending bar member 52 to which are pivotally attached guide brackets 53 for the implement beams 39 and 39'. Slidably mounted in the lifting guide brackets 53 are lifting links 54. Mounted on the lifting links 54 are pressure springs 55 held in adjusted position under compression by a collar 56. The lifting links 54 are pivotally mounted at their lower ends to the draft plates 42 and are adjustably held in vertical position by an adjusting collar 57 at their upper ends. It is, therefore, seen with this construction of the lifting links to the implement beams that pressure may be exerted upon the ground engaging tools and at the same time a lost motion connection is provided by the lifting links and the lifting brackets to permit the raising of the implement tools in the event that an obstruction is encountered. It is also to be understood that the maximum depth of the implement beam may be adjusted by the stop collar and by a spring pressure adjusting collar 56. With this type of implement beam construction the implement beam is allowed to rise and fall in a parallel relationship to its previous position and the implement beam is also gauged by the adjusting shoe 44 substantially in line with the front wheels 13' of the tractor. Therefore, the implement tools at the forward part of the tractor are gauged by the front steering wheels.

Attached to the rear portion of the tractor are the rear implement beams which have attached thereto ground engaging tools to cut away the tracks of the rear tractor wheels and to cultivate between the tools of the front cultivators. Rear implement beams 58 and 58' extend rearwardly and outwardly back of the rear tractor wheels 13. The implement beams or arm members 58 and 58' are pivotally mounted at their forward ends to a transverse draft stud 59 attached to each depending housing 12. The forward portions of the beams 58 and 58' extend at their forward ends outwardly and forwardly to where they are attached by draft connections 60 of each implement beam to their respective draft connections 59. At the rear ends of the implement beams, implement standards 61 are adjustably mounted by standard brackets 62 to the implement beams. Attached to the implement standards 61 are cultivator shovels 63. It is to be understood that the cultivator shovels 46 of the front cultivator beams and the cultivator shovel 63 of the rear cultivator beams may be adjusted vertically or angularly by their respective standard brackets 48 and 62. In order to adjust the rear cultivator beams 58 and 58', there is a spring pressure rod 64 slidably and loosely mounted in a bracket 65 which is secured to the implement beam 58 and 58' in the usual manner. To limit the movement of the spring pressure rod 64, an adjusting collar 66 is attached to the lower end of the spring rod 64. For putting spiral spring 67 under pressure, there is a spring adjusting collar 68. The upper end of the spring adjusting rod 64 is welded or otherwise secured to an adjusting quadrant 69. The pressure rod 64 for the rear gangs and the adjusting quadrant 69, since they are securely attached, move together as one and the rod 64 pivoting in the loose connection in the bracket 65. When the power lift mechanism 17 is operated, the quadrant 69 and adjusting lever 71 pivot about a plate or lifting arm 72 that attaches it to a lifting rocker arm 76 and do not pivot with respect to the tractor. Considering the beam or arm 58 as a pivot arm and the lifting means 76 as another pivot arm, the quadrant 69 and lever 71 interconnect two pivot arms on the tractor, giving them parallel motion when operated by the power lift. The adjusting quadrant 69 is pivotally mounted at its forwardly extending portion between the lower forked ends 70 of the adjusting lever 71. The adjusting lever 71 is adjusted about the adjusting quadrant 69 and latched in its adjusted position by the usual thumb latch and detent mechanism. The quadrant 69 and lever 71 thus provide a manual actuating means for separately adjusting or regulating the working depth of the rear implement. When the adjusting lever 71 is adjusted for any working depth and the power lift is operating to lift implement beams, the adjusting lever 71, taking with it the quadrant 69, which is latched in place, and pressure rod 64, pivots about the lifting arm 72 at the lever's pivot point 73. The spring pressure rod which is welded to the quadrant thus has for its pivot the pivot point 73 of the adjusting lever. As the adjusting lever 71 is moved downwardly or to the left, as shown in Figure 1, about the adjusting quadrant, and about the pivot 73, the adjusting quadrant 69 moves forwardly and upwardly with the end 70 of the adjusting lever. This movement tends to raise the pressure rod 64, the same being fixed to the quadrant, which in turn adjusts the ground engaging tools upwardly to decrease their working depth. As the lifting lever 71 is raised upwardly or to the right as shown in Figure 1, the adjusting quadrant 69 moves rearwardly and lowers the pressure rod 64 which, as it is connected to the implement beams, permits the adjusting of the ground engaging tools downwardly about the draft connection to increase their working depth. The lever 71 extends to within reach of an operator's station 74 of the tractor. As previously pointed out, the spring pressure connection of the front implement beams forms a lost motion connection; likewise, the spring pressure connection for the rear implement beams forms a lost motion connection for the rear implement beams and any obstruction that is encountered by the ground engaging tools permits the rising of the implement beams to free the ground engaging tools from the obstruction and in a similar manner pressure may also be applied to the ground engaging tools on the rear implement beams.

Attached to the depending housings 12 and extending transversely across the rear end of the tractor and to the rear of the rear axle housing 11 is a transverse supporting member 75. Pivotally mounted on each side of the tractor are power lift means or arms 76 in the form of U-shaped members having their leg portions at their lower ends welded or otherwise secured to a spacing member 77 which in turn acts to journal a U-shaped arm on the transverse member 75. Extending forwardly from an inner leg portion 76' of each lifting member 76 are lifting links 78. The lifting links 78 are pivotally connected at their rear ends to the upper part of the member 76' and at their forward ends are pivotally connected to the crank members 33 and 34, respectively. It is, therefore, seen that by the oscillation of the one-half revolution clutch members the lifting members 76 on each side of the tractor will be in turn oscillated in a fore and aft direction on the transverse member 75. The arm 72 to which the lever 71 is pivotally connected is secured to an outer leg portion 76'' of the power lift arm 76 and constitutes a part thereof. Therefore, any reciprocation of the adjusting arm 76 will, in turn, cause the raising and lowering of the implement beams 58 and 58'. The lifting beams 50 at their rear ends are pivotally connected to their respective adjusting levers 79 positioned at each side of the tractor through a pivot arm 79ª at a pivot 79ᵇ on its offset upper end, the lifting levers 79 being pivotally connected at their lower ends to the pivot arm 79ª below the offset upper end at 79ᶜ. The pivot arm 79ª is, in turn, pivoted at its lower end to a lever bracket 80 which is secured to the rear axle housing 11. As each adjusting lever 79 and its cooperating mechanism is the same for each side of the tractor only one will be described and like reference characters will denote similar parts. The adjusting lever 79 is pivoted to an adjusting quadrant 81 at the mid-portion 79ᵈ of a forwardly extending portion 81' of the adjusting quadrant 81. The rear portion 81'' of the adjusting quadrant 81 is pivotally connected to the adjusting arm 76 to the leg portion 76'' thereof at its upper end. The lever 79 is adjusted about the adjusting quadrant 81 by the usual thumb latch and detent. It is, therefore, seen that the effective length of the lifting beam between its connection to the lifting lever 79 and the adjusting arm 76 may be adjusted by the relative movement of the adjusting lever 79 with respect to the quadrant 81. As the adjusting lever 79 is moved forwardly the forward implement tools in their ground engaging position are adjusted downwardly while if the adjusting lever 79 is moved rearwardly the ground engaging tools in their ground engaging position are raised. The levers 79 are used to adjust the forward or front ground engaging tools on each side of the tractor in their working position only and are not to be used for transporting. When the cultivator is in its raised position, the arm 81' on which the lower end of the front adjusting lever 79 pivots is in a position so that it is almost in a straight line with the front lifting beam 50. By having the two pivot points on this arm and the front pivot point on the front lifting beam near to a straight line, any adjustment of the front adjusting lever 79 is ineffective in moving the lifting beam 50 forward or back at the point where the front gangs hang from the lifting beam 50 in the raised position of the front gangs. The front adjusting quadrant 81 with the lever 79 acts as an adjustable link between the lever pivot arm 79ª on the tractor housing 11 and the rocker arm 76 that is operated by the power lift mechanism 17 in raising or lowering. The quadrant 81 and the lever 79 acting as a link move longitudinally with the tractor when the power lift mechanism 17 is operated. It is, therefore, obvious when the power lift mechanism is operated and the lifting arm 76 is actuated to move forwardly that reciprocatory motion of this member is transmitted to the pivoted lever 79 by means of the lower portion of the adjusting quadrant 81'' which acts as a link between the lifting levers 79 and the lifting arm 76. Any reciprocatory motion of the lifting lever 79 is, in turn, transmitted to the lifting beams 50 which in turn causes the ground engaging tools attached to the parallel draft members to be raised or lowered depending upon the forward or aft movement of the lifting arm 76. The quadrant 81 and lever arm 79 thus provide a manual actuating means for separately adjusting or regulating the working depth of the front implements. The means is thus supported between two pivot arms on the tractor. By so mounting the manually actuated means for each of the front and rear implements that each are supported respectively between two pivot arms on the tractor, both will be given parallel and equal movements of translation horizontally of the tractor to particularly maintain the alinement of their adjusting levers when the power lift arm is operated to vertically move the implements on the tractor.

The tractor, as it travels down the field, is steered from the operator's station by a steering wheel 82.

As the adjusting levers 71 and 79 are positioned on each side of the tractor and are for the respective adjustment of the rear and front implement tools in their ground engaging position, it is obvious that the operator of the tractor can easily adjust either the forward or the rear tools or one or the other of the implement beams of the fore and aft cultivator units.

Therefore, any deviation in depth of cultivation of each cultivator beam may be quickly adjusted. As the operator reaches the end of the row, he may raise and lower the cultivator gangs simultaneously by tripping the foot lever 20 which in turn releases the clutch of the one-half revolution type to raise or lower the cultivator beams from ground engaging to transporting position. As the clutch is of the one-half revolution type, the beams are either raised or lowered and locked in their respective positions at the end of each cycle of operation and the clutch must be tripped for each raising or lowering of the implement tools.

The operation of the tractor mounted implement will be clear from the following description. The longitudinally extending lifting beams 50 which are actuated by the power lift mechanism through the lifting arms 76 and the adjusting lever 79 are operable to lift and lower the soil engaging units by means of the lifting beams 50 and the associated elements at each end thereof. The rearwardly positioned units are lifted and lowered by means of the lifting arm 76 connected to the power lift mechanism by means of the lifting arm 72 and the adjusting lever 71 and its associated parts above described in detail. The operator of the tractor, by independent operation of the levers 71 and 72 may selectively lift either the forwardly or the rearwardly positioned implements. This is a particularly advantageous feature under a great many conditions. For example, when an obstruction such as a rock is encountered the front implements may be lifted to pass over the rock and then lowered into working position. The rear implements may be operated in a like manner. However, if any slight obstruction is encountered, the ground engaging tools may free themselves because of the lost motion connection between the ground engaging tools and the lifting mechanism. Likewise, the rear implements may then be operated in a like manner. Another example of the utility of this construction is when cultivating row crops it is desirable that both the rear and front implements be operated to the end of the row whenever possible. Whenever there is sufficient room for a tractor to maintain its forward movement, the forward implements may be lifted when the end of the row is reached. Subsequently the rear implements may be lifted when said implements have reached the end of the row. The same procedure may be followed in a reverse manner on beginning the row. It is to be understood that for maximum transport position the power lift mechanism may be operated which simultaneously raises and lowers the front and rear implement gangs, while the adjusting levers 71 and 79 are operable to lift only the cultivating implements from the ground engaging position to a slight clearance above ground.

It is to be understood that the applicant has shown and described only a preferred embodiment of his improved power lift attachment for tractor mounted implements and that he claims as his invention all modifications falling within the scope of the appended claims.

What is claimed is:

1. In combination with a tractor having a power lift pivot arm, front and rear implements mounted for movement on the tractor, quadrant and lever means for regulating the working depth of the front implement, quadrant and lever means for regulating the working depth of the rear implement, both of said quadrant and lever means being pivotally connected to the power lift arm at points removed thereon from its point of pivot on the tractor, and means for further supporting each of the quadrant and lever means and for connecting same to their respective implements; whereby substantially an equal and parallel motion horizontally of the tractor will be given to both quadrants and lever means during the operation of the power lift to move the implements.

2. In combination with a tractor, front and rear implements pivotally connected to the tractor, a lift means on the tractor, a manually actuated means for separately adjusting the front implement, and a manually actuated means for separately adjusting the rear implement, each of said adjusting means including a lever member and a quadrant member, one of the members of each adjusting means being pivotally connected to the lift means and the other member of each adjusting means being connected to the respective implement.

3. In combination with a tractor, front and rear implements pivotally connected to the tractor, a lift means on the tractor, a manually actuated means for separately adjusting the front implement, and a manually actuated means for separately adjusting the rear implement, each of said adjusting means including a lever member and a quadrant member, one of the members of each adjusting means being pivotally connected to the lift means, two pivotally connected members on the tractor, one for each implement, and the other member of each adjusting means being connected to the respective pivotally connected members for the respective implements, whereby each quadrant and lever is supported between the power lift and its respective pivot member.

4. In combination with a tractor, front and rear implements mounted for movement thereon, manual actuated means for regulating the working depth of the front implement, manual actuated means for regulating the working depth of the rear implement, power lifting means on the tractor connected with at least one of said manual actuated means, and both of said manual actuated means being so connected with respect to each other and their respective implements so that they are given substantially equal movements of translation horizontally of the tractor to maintain their alinement with respect to each other when the power lift means is operated to lift the implements.

5. In combination with a tractor having a power lift arm, front and rear implements mounted for movement on the tractor, manual actuated means for regulating the working depth of the front implement, manual actuated means for regulating the working depth of the rear implement, each of the manual actuated regulating means including a quadrant member and a lever member adjustable relative to each other, both of said manual actuated means pivotally connected to the power lift arm by one of its members and other of its members pivotally connected to its respective implement, whereby each actuated means will be moved bodily together horizontally of the tractor when the power lift arm is operated to move the implements.

6. In combination with a tractor, a power operated pivot arm, front and rear implements mounted for movement on the tractor, a second pivot arm mounted on the tractor and connected to the front implement, a manual actuated means for the front implement pivotally connected to the power arm and to the second pivot arm, manual actuated means for the rear implement pivotally connected to the power pivot arm rearwardly thereof in spaced relation with the front actuated means and connected to the rear implement, whereby both front and rear manual actuated means will move forwardly together with a translatory motion maintaining their alinement with respect to each other when the power arm is operated to move the implements.

HIRAM P. SMITH.